Dec. 29, 1953 H. G. IRWIN 2,664,078
ARROW SHOOTER
Filed Dec. 20, 1952
3 Sheets-Sheet 1
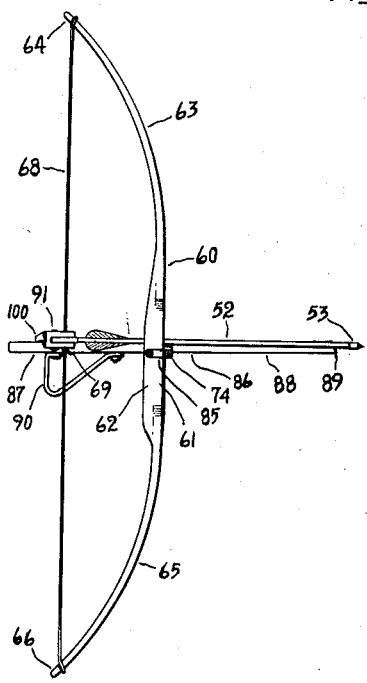
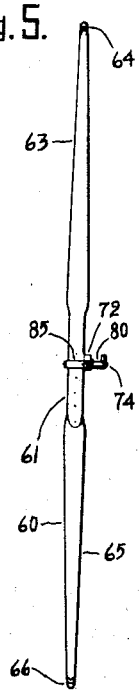
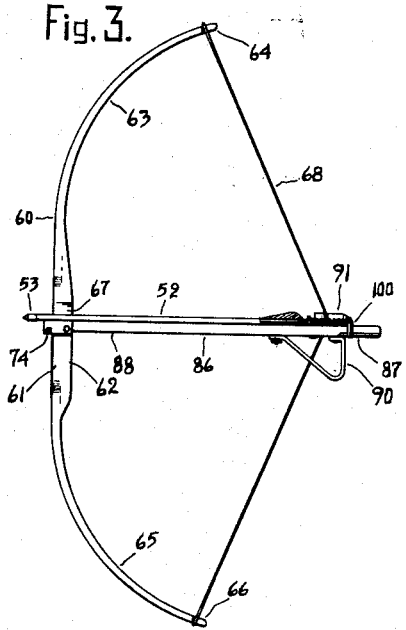
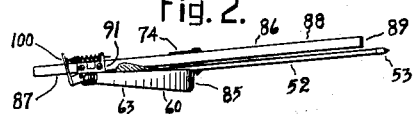
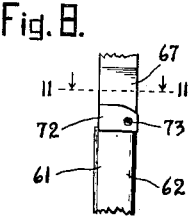
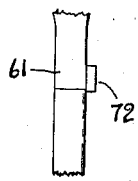
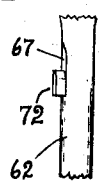
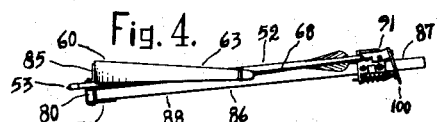
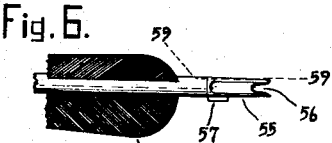
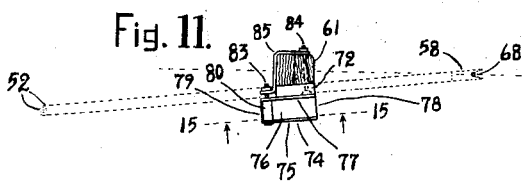
INVENTOR
Herbert G. Irwin Dec. 29, 1953     H. G. IRWIN     2,664,078
ARROW SHOOTER
Filed Dec. 20, 1952     3 Sheets-Sheet 2
Fig. 12. 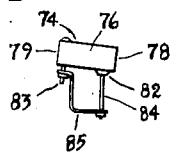   Fig. 13. 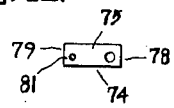   Fig. 14. 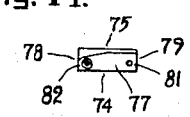   Fig. 15. 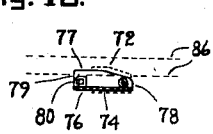
Fig. 16. 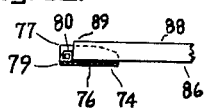   Fig. 17.    Fig. 18. 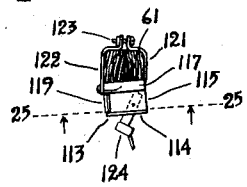   Fig. 19. 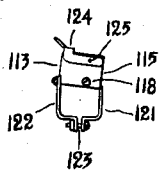
Fig. 20. 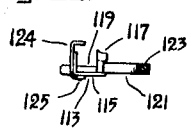   Fig. 21. 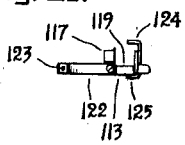   Fig. 22. 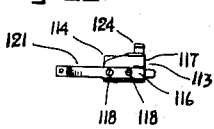   Fig. 23. 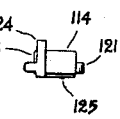
Fig. 24. 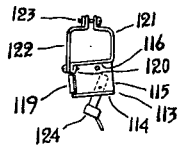   Fig. 25. 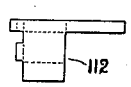   Fig. 26. 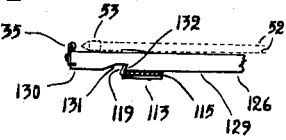
Fig. 28.    Fig. 27. 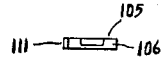   Fig. 29. 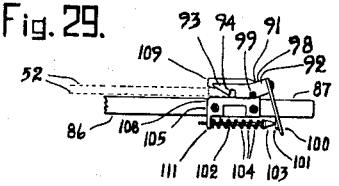

Fig. 30. 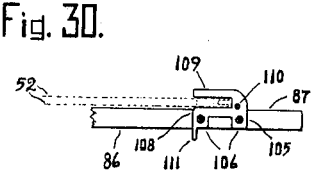   Fig. 33. 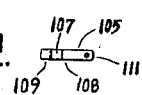
INVENTOR
*Herbert G. Irwin.*
Fig. 32.

Patented Dec. 29, 1953

2,664,078

UNITED STATES PATENT OFFICE 2,664,078

ARROW SHOOTER

Herbert G. Irwin, Noble, La.

Application December 20, 1952, Serial No. 327,097

3 Claims. (Cl. 124—24)

This invention relates to an arrow shooter, and contemplates a bow provided with a bow string draw-bar having an arrow chuck including a latch for latching the arrow chuck onto the bow string with an arrow nocked on the bow string, a handle on the draw-bar for drawing back the draw-bar and chucked arrow and bow string to the position for shooting the arrow, an arrow rest and a draw-bar guide and a draw-bar catch shoulder together on the bow for supporting the forward portion of the arrow and the draw-bar and holding the draw-bar in the shooting position for taking aim, and a trigger on the bow string latch of the arrow chuck for releasing the bow string to shoot the arrow, whereby steady shooting may be done in target work and hunting.

Other objects and advantages of this invention will appear throughout the following specification and claims.

In the drawings:

Figure 1 is an elevational view of the right side of a bow provided with a bow string draw-bar and guide in accordance with the present invention for use by a right handed person. An arrow is shown in the chucked position.

Figure 2 is a plan view of the top end and top side of the arrow shooter shown in Figure 1.

Figure 3 is an elevational view of the left side of the arrow shooter shown in Figures 1 and 2. The draw-bar, latched bow string and chucked arrow are drawn back to the position for shooting the arrow.

Figure 4 is a top end and top side plan view of the arrow shooter in the shooting position shown in Figure 3.

Figure 5 is a front side elevational view of the bow shown in Figures 1, 2, 3 and 4. The draw-bar is removed from the guide.

Figure 6 is a plan view of the nock-end of an archer's arrow which may be modified to enter the arrow chuck and discharge from the chuck fairly accurately.

Figure 7 is a plan view of the off side of a modified nock-end of an archer's arrow.

Figure 8 is an enlarged left side view of a portion of the bow stock at the upper end of the handle or grip, showing the arrow rest block mounted in the lower end of a bevel in the side of the bow.

Figure 9 is a front side view of the portion of the bow stock shown in Figure 8, showing the front end of the mounted arrow rest block.

Figure 10 is a rear side view of the portion of the bow stock shown in Figures 8 and 9, showing the rear end of the arrow rest block and the rear edge of the bevel on the side of the bow.

Figure 11 is a cross sectional view of the bow stock along line 11—11 of Figure 8, showing the top side of the arrow rest block and the channel side of the draw-bar guide clamped on the bow.

Figure 12 is a plan view of the under side of the draw-bar guide.

Figure 13 is an elevational view of the left side of the draw-bar guide. The front clamp bolt is removed.

Figure 14 is an elevational view of the right side of the draw-bar guide.

Figure 15 is a longitudinal sectional view of the bottom of the draw-bar guide along line 15—15 of Figure 11.

Figure 16 is a sectional view similar to Figure 15 but showing the front end of the draw-bar positioned against the draw-bar catch.

Figure 17 is an enlarged perspective view of the draw-bar catch employed in the draw-bar guide shown in Figures 1, 2, 3, 4, 5, 11, 12, 13, 14, 15 and 16.

Figure 18 is a sectional view similar to Figure 11, but showing the channel side of a modified form of draw-bar guide mounted in the bevel in the side of the bow. The draw-bar retainer of the guide is shown in the open position.

Figure 19 is a plan view of the under side of the form of draw-bar guide shown in Figure 18. The draw-bar retainer is in the closed position.

Figure 20 is a rear end elevational view of the form of draw-bar guide shown in Figures 18 and 19.

Figure 21 is a front end elevational view of the form of draw-bar guide shown in Figures 18, 19 and 20.

Figure 22 is an elevational view of the right side of the form of draw-bar guide shown in Figures 18, 19, 20 and 21. The front section of the band clamp is removed and the rear section of the band clamp is bent backwardly to avoid obstruction in the view.

Figure 23 is a left side elevational view of the form of draw-bar guide shown in Figures 18, 19, 20, 21 and 22.

Figure 24 is a plan view of the channel side of the form of draw-bar guide shown in Figures 18, 19, 20, 21, 22 and 23, without the arrow rest portion of the right wall, the arrow rest being removed to show how the front section of the band clamp is attached to the front end of the guide.

Figure 25 is a sectional view of the bottom of the modified form of draw-bar guide along line 25—25 of Figure 18. The lower portion of the draw-bar retainer is in the closed position as shown in Figure 19.

Figure 26 is a sectional view similar to Figure 25, but showing one shoulder of a catch notch in a modified form of draw-bar positioned against the draw-bar catch of the guide.

Figure 27 is a plan view of a metal blank which may be employed in forming the draw-bar guide shown in Figures 18 to 26 inclusive.

Figure 28 is a perspective view of the arrow rest portion of the right wall of the draw-bar guide shown in Figures 18 to 26 inclusive.

Figure 29 is a plan view of the upper side of the arrow chuck employed on the rearward portion of the bow string draw-bar.

Figure 30 is a plan view of the upper side of the arrow chuck plate.

Figure 32 is an elevational view of the front edge of the arrow chuck plate.

Figure 33 is a plan view of the under side of the arrow chuck plate.

Figure 34 is an upper side plan view of an arrow chuck plate provided with a nock clamp spring.

Figure 35 is a perspective view of the nock clamp spring employed on the left jaw of the chuck plate shown in Figure 34.

Figure 36 is a longitudinal plan view of the trigger spring guide pin.

Figure 37 is a left side elevational view of the bow string latch portion of the arrow chuck.

Figure 38 is a right side elevational view of the bow string latch portion of the arrow chuck.

Figure 39 is a front end elevational view of the bow string latch portion of the arrow chuck.

Figure 40 is a rear side elevational view of the bow string latch trigger.

Figure 41 is a front side plan view of the bow string latch trigger.

Figure 42 is a plan view of the upper side of a modified bow string draw-bar including an extended rear end portion and provided with a front sight and a rear sight.

Figure 43 is a left side elevational view of the form of draw-bar shown in Figure 42.

Figure 44 is a front end elevational view of the form of draw-bar shown in Figures 42 and 43.

Figure 45 is an elevational view of the right side of the rear sight column and a portion of the draw bar.

Figure 46 is a plan view of the under side of the draw-bar portion included in Figure 45, showing the rear sight column adjustment means.

Figure 47 is a front side elevational view of the rear sight column. The slide for carrying the rear sight is being removed.

Figure 48 is an enlarged longitudinal sectional view of the rear sight slide along line 48—48 of Figure 45.

Figure 49 shows the knot employed on the bow string for properly locating the arrow chuck on the bow string.

Figure 50 shows two knots on the bow string for properly locating the arrow chuck on the bow string.

Figure 31:
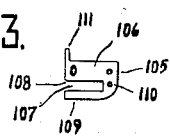
Figure 31 is an elevational view of the left edge of the arrow chuck plate.

Upon reference to Figures 1, 2, 3, 4 and 5 of the drawings it will be noted that 60 indicates a bow including a stock portion 61 between upper and lower limbs 63 and 65 and the bow limbs have ends 64 and 66 adapted to hold opposite ends of a taut bow string 68. The bow is provided with a handle or grip 62, an arrow rest 72, a bow string 68, a bow string draw-bar 86, and a bow string draw-bar guide 74. The grip is located on the stock of the bow. The arrow rest and draw-bar guide are located on the side of the bow at the upper end of the grip. The bow string draw-bar has a rearward portion 87 and a forward portion 88. The rearward portion of the draw-bar has a handle 90 and an arrow chuck 91. The forward portion of the draw-bar is slidable backwardly in the draw-bar guide. Figure 1 shows the bow string stretched between the upper and lower ends of the bow, and the bow string has a knot 69 for properly locating the arrow chuck on the bow string with respect to the arrow rest. An arrow 52 is shown reposed on the arrow rest and the nock-end of the arrow is chucked in the arrow chuck with the bow string.

Shown in more detail in Figures 8, 9, 10 and 11, the side of the bow at the upper end of the grip is beveled at 67 to afford clearance for the arrow and a seat for the arrow rest block 72. The broad side of the bevel nearly parallels an arrow nocked on the bow string and placed against the broad side of the bevel as shown in Figure 11 wherein broken lines 52 indicate an arrow shaft nocked on the bow string 68 which latter is positioned as when stretched between the ends of the bow. The arrow rest block 72 is seated in the lower end of the bevel and suitably fastened in place; a strong cement is usually employed as a fastener. A bolt hole 73 extends through the rear end portion of the arrow rest block and through the rear portion of the bow stock to receive the draw-bar guide clamp bolt 84. Referring also to Figures 12 to 17 inclusive, the right side wall 77 of the draw-bar guide 74 is clamped against the arrow rest block 72 with bolts 83 and 84 and a clamp band 85, the bolt 84 having a flat head countersunk in a depression 82 around the rear bolt hole in the wall 77. Bolt 83 extends through aligned bolt holes 81 and 81 in the front end portions of the opposite side walls 75 and 77 of the draw-bar guide and through the perforated front end portion of the clamp band 85. The draw-bar guide 74 is channel shape in cross section and has a draw-bar catch 80 which latter is located adjacent to the front end 79 and bottom 76 of the guide. The draw-bar catch 80 has the shape of a sleeve with square outside corners and serves also as a spacer sleeve on clamp bolt 83 and between the front end portions of the opposite side walls 75 and 77 of the guide. In Figure 15, broken lines 86 indicate the draw-bar reposed on the upper side of the catch 80 as when the draw-bar is positioned as shown in Figures 1 and 2. In Figure 16 the front end 89 of the draw-bar 86 is shown caught on the catch 80 as when the draw-bar is positioned as shown in Figures 3 and 4.

The arrow chuck 91 includes a plate portion 105 and a double bow string latch portion 92 shown in more detail in Figures 29, 30, 31, 32, 36, 37, 38 and 39. The left edge portion 105 of the chuck plate is bolted onto the upper side of the draw-bar or may be otherwise securely attached to the draw-bar. The portion of the chuck plate projecting over the right side of the draw-bar is slightly thicker than the nock-end of the arrow. The throat 107 in the overprojecting portion of the chuck plate extends backwardly from the front edge of the plate between the rigid left chuck jaw 108 and the rigid right chuck jaw 109. The throat 107 is slightly wider than the nock-end of the arrow is thick, and the throat receives the nock-end of the arrow and the bow string. The hole 110 in the rear edge portion of the chuck plate and located to the left of the longitudinal center of the throat 107, receives the cross screw 99 by which latter the string latch portion of the chuck is pivotally mounted on the chuck plate. The string latch portion of the arrow chuck includes the upper latch jaw 93 and the lower latch jaw 96, which are spaced apart by the throat 95. The latch jaws are integral at the rear 98 where the trigger 100 is attached. The throat 95 is slightly wider directly between the latch jaws than the chuck plate is thick. The latch jaws are pivotally mounted on opposite sides of the chuck plate above and below the plate throat 107 with the cross screw 99 which latter extends through aligned holes in the latch jaws and hole 110 in the chuck plate. Preferably, the latch jaws are a little wider than the plate throat 107, and the cross screw 99 is offset to the left of the longitudinal center of the latch jaws. Aligned bow string latch grooves 94 and 97 in the left sides of the latch jaws forward of the cross screw, receive the taut bow string above and below the throats 95 and 107 to latch the arrow chuck onto the bow string. The latch grooves are usually made about as wide as the arrow nock groove, and the shorter front sides of the latch grooves are usually made about one thirty-second of an inch deeper than the bow string is thick, but deeper latch grooves may be employed if desired. All corners which contact the bow string are well rounded and smooth to avoid cutting the bow string. The vertical centers of the latch grooves and the longitudinal center of the cross screw 99 are usually spaced apart about five one-eighths of an inch, but more or less spacing may be employed if desired. Referring also to Figures 40 and 41, the trigger is rigid with the rear 98 of the bow string latch and the trigger extends from the latch over the draw-bar behind the chuck plate and downwardly near the left side of the draw-bar to within easy reach of the thumb of the right hand embracing the draw-bar handle. The trigger spring guide pin 102 has a pointed head 103 seated in a socket 101 on the front side of the left end portion of the trigger, and the front end portion of the guide pin extends through the rigid perforated projection 111 on the left front corner of the chuck plate. The spiral trigger spring 104 is mounted on the guide pin between the head 103 and the projection 111 to press the trigger backwardly and thereby spring press the latch jaws to the left and the latch grooves onto the taut bow string.

The bow shown is made of suitable wood, but a bow of tough glass fibers and hardened plastic, suitable light metal or other suitable material may be employed if desired. The draw-bar may be made of suitable wood, light metal, plastic, or other suitable material. Preferably, the draw-bar is square in cross section, and the size in cross section is usually proportioned to the length of the arrow or the draw weight of the bow. A draw-bar about one-half of an inch square in cross section may be employed with a light bow for shooting an arrow about eighteen inches long. A draw-bar about eleven-sixteenths of an inch square in cross section may be employed with a heavier bow suitable for shooting an arrow about twenty-eight inches long. A thicker draw-bar may be employed with a heavy bow if desired. The arrow rest block 72 may be made of hard felt, hard leather, hard rubber, plastic, wood, or other suitable material. The draw-bar guide 74 and the catch 80 is usually made of suitable sheet metal, but a draw-bar guide and catch may be formed integral in a casting of aluminum, tough aluminum alloy, or other suitable molding metal. If preferred, a draw-bar guide, draw-bar catch and arrow rest block may be formed integral in a casting of light tough metal. The arrow chuck plate 105 may be made from an aluminum casting, or made from a casting of iron, or other suitable material. A chuck plate can be made from a blank cut from a flat bar of aluminum, brass, or mild steel. A chuck plate of hardened tough plastic may be employed on a draw-bar for a toy bow. If preferred, a chuck plate of plastic may be formed integral with a plastic draw-bar, or a chuck plate of light metal and a draw-bar of light metal may be formed integral in a casting. The bow string latch may be made from a casting of tough aluminum alloy, aluminum, brass, steel, or iron; the latter may be employed in a string latch of a chuck on a draw-bar for a light bow. A string latch can be made from a blank cut from a flat bar of aluminum, brass, or mild steel. The trigger may be made from a casting of aluminum, brass, or other suitable material. A trigger can be made from a blank cut from sheet, strip, or flat bar of aluminum, brass, or steel. If preferred, a trigger and bow-string latch may be formed integral in a metal casting. The draw-bar handle may be made of flat round edge aluminum bar stock, but other suitable material may be employed in the handle if desired. A draw-bar handle having a round grip portion can be made of round aluminum, brass, or steel tubing, or made from a casting of light metal. If preferred, a handle and draw-bar may be formed integral in a casting of light metal, or molded integral of plastic.

The form of arrow nock-end shown in Figure 6 includes a plastic nock 55 having a notch or groove 56 in its rear end for seating the nock on the bow string. The nock has a ridge-like projection 57 aligned with the odd colored feather 54, and this projection and feather project at about right angles with the nock groove 56. This form of nock tapers down slightly in diameter toward the grooved rear end. Target, field and hunting arrows having this form of nock-end are available on the open market at the present time and may be used with the present arrow shooter upon modifying the plastic nock as by removing the taper on the off side along broken line 59—59, removing the projection 57, and sizing the throat of the arrow chuck to receive the modified nock with only a little play. In Figure 7 numeral 59 indicates the facet formed when the taper on the off side of the nock shown in Figure 6 is removed along line 59—59 by a plane cutting operation. In chucking an arrow having the modified nock 58, the nock is pushed backwardly into the throat of the arrow chuck with the odd colored feather 54 positioned nearly parallel with the upper side of the draw-bar, and thus the facet 59 faces the right jaw 109 of the chuck plate.

The arrow shooter shown is constructed for use by a right handed person. In placing the draw-bar on the strung bow as shown in Figures 1 and 2, the bow may be held in the vertical position with the left hand placed around the grip so that the base knuckle of the forefinger will be under the front end of the draw-bar guide, and the draw-bar may be held in the horizontal position with the right hand placed around the handle so that the middle knuckle of the forefinger will be under the rear end of the arrow chuck, and then by placing the draw-bar at about its midway portion in the draw-bar guide, the draw-bar may be pushed forward in the guide to enter the taut bow string into the chuck plate throat and the string latch grooves immediately above the knot 69. The bow string and knot will support the arrow chuck and rear end portion of the draw-bar while the arrow is being chucked with the right hand. In chucking the arrow, the arrow may be gripped between the thumb and first two fingers of the right hand placed about six inches forward of the feathers, and by reaching the arrow around the right side of the bow to the front of the bow, the nock-end of the arrow may be turned backwardly on the left side of the bow immediately above the arrow rest and the nock pushed into the throat of the arrow chuck to seat the nock on the latched bow string and with the odd colored feather positioned at nearly right angles with the bow string and nearly parallel with the upper side of the draw-bar. Some lateral pressure on the bow string by the hinged spring pressed latch jaws and some additional pressure by the bow string against the left side of the nock groove when making the draw, holds the nock seated on the bow string during the draw. In making the draw to the shooting position shown in Figures 3 and 4, the bow may be held with the left hand as indicated above, but with the left arm extended outwardly, and with the fingers of the right hand curved around the draw-bar handle, the draw-bar may be drawn back until the front end thereof falls down behind the draw-bar catch, whereupon the draw may be discontinued to abut the front end of the draw-bar against the rear side of the catch as shown in Figure 16, which will hold the draw-bar in the shooting position for taking aim. In taking aim, the left hand remains on the grip of the bow and the left arm extended outwardly, but all of the left arm should be positioned clear of the shooting stroke of the bow string. The fingers of the right hand may remain curved around the draw-bar handle, but the thumb is placed on the rear side of the end of the trigger extending downwardly on the left side of the draw-bar. Aim may be taken by sighting down the draw-bar at the target, and the bow string may be loosed to shoot the arrow by pressing the trigger forward with the thumb of the right hand. Pressing the left end of the trigger forward moves the front ends of the hinged bow string latch jaws to the right which strips the bow string out of the latch grooves.

Referring to Figures 18 to 28 inclusive, the draw-bar guide 113 is channel shape in cross section and has the left side wall 114, the bottom 115, the right side wall portion 116, the draw-bar catch 119, the lug 120, and the rear section 121 of the band clamp, formed integral from a sheet metal blank such as blank 112 shown in Figure 27. The blank may be cut from suitable sheet metal having the uniform thickness and strength desired. A blank cut from tough sheet brass stock having a uniform thickness of about one-sixteenth of an inch may be used in making a guide for a draw-bar about five one-eighths of an inch square in cross section, for use on a bow having a draw weight in the neighborhood of forty-five to fifty pounds. The lug and the rear section of the band clamp are integral with opposite ends of the side wall portion 116. The front section 122 of the band clamp has one end attached with a screw to the lug 120. The sections of the band clamp are connected with a bolt 123. The arrow rest block 117 and the side wall portion 116 form the right side wall of the draw-bar guide. The arrow rest block is attached to the side wall portion 116 and bottom 115 with flat head screws 118, 118 and 118. The arrow rest block 117 may be made of hard fiber, hard felt, hard rubber, plastic, or light metal. If preferred, a metal arrow rest block may be made with the lower portion extended the full length of the side wall portion 116, and the wall portion 116 may be formed without the lug 120, and the front section 122 of the band clamp may be attached with the screw to the front end of the metal arrow rest block. The draw-bar catch 119 is located adjacent to the front end and bottom of the draw-bar guide. The draw-bar retainer 124 is hinged at 125 to the bottom of the draw-bar guide, and the retainer may be pulled open as shown in Figure 18 for placing the draw-bar in the guide. The draw-bar retainer may be moved to the closed position as shown in Figures 19, 20, 21 and 22, to retain the draw-bar in the guide. The draw-bar guide 113 may be clamped on the bow in the place of the arrow rest block 72 and the draw-bar guide 74. The draw-bar guide 113 may be employed in providing an archer's bow with a draw-bar such as draw-bar 86, or draw-bar 126.

The draw-bar guide 74, or guide 113, may be adapted for use on an archer's bow made of metal, or an archer's bow having a stock portion which is round or about round in cross section. The draw-bar guide can be adapted for mounting on a bow not having a bevel seat such as 67, if a bevel is not desired.

The bow string draw-bar 126 has a rearward portion 127, an extended rear end portion 128, and a forward portion 129. The rearward portion of the draw-bar has a handle 90, an arrow chuck 91, and is provided with a rear sight column 136. The handle and the arrow chuck are located on the draw-bar adjacent to the extended rear end portion 128. The rear sight column is located on the draw-bar a short distance forward of the arrow chuck. The forward portion of the draw-bar is adapted to slide backwardly in a draw-bar guide having a draw-bar catch adjacent to its front end and bottom. The forward portion of the draw-bar has an under side which may be provided with a notch 131 as shown in Figure 26, or provided with two notches 131 and 132 as shown in Figure 43. The notches have shoulders 132 and 134 adapted to drop down behind the draw-bar catch in a draw-bar guide on the bow to hold the draw-bar in the drawn back position with the bow string latched in the arrow chuck. Broken lines 52 indicate a chucked arrow having a head 53. The forward portion of the draw-bar extends a short distance beyond the head of the chucked arrow, and the front catch notch 131 is located in the under side of the draw-bar a short distance back of the arrow head 53. The catch notch 133 may be located for shooting a shorter arrow, or located for step-drawing the bow string of a heavy bow. A front sight 135 is mounted on the front end 130 of the draw-bar, and the sight is adjustable to the left or to the right of center a short distance. The rear sight column, shown in more detail in Figures 42, and 44 to 47 inclusive, has its lower end portion rigid with the down-turned portion of the angular spring bracket support 137 which latter has an angled portion bolted onto the upper side of the draw-bar with an oppositely disposed angular anchor bracket 138. The anchor bracket has a portion extending down from the under side of the draw-bar to anchor the head end of the sight column adjustment bolt 139. The bolt 139 has a threaded end projected through the perforated lower end of the sight column to receive the sleeve nut 140. The upper end of the sight column may be adjusted to the left or to the right by turning the nut 140 to the left or to the right. The sight column is channel shape in cross section and has a channel slide 141 which is slidable up or down on the column. The slide has at its upper end a bracket 142 embracing the sight column and carrying the rear sight 145 which latter is adjustable on the bracket to the left or to the right a short distance. The slide, shown in more detail in Figure 43, has a blade-like friction spring 143, the latter being slightly narrower than the channel in the sight column and having an upper end 144 which presses against the bottom of the channel in the sight column to hold the slide in the set position on the sight column.

Bow string draw-bar 126 having only one catch notch 131 located forward of the arrow chuck the proper distance for holding in the shooting position an arrow of the proper length for the bow, may be used in the place of draw-bar 86 for holding the bow string and arrow in the shooting position while aim is taken with sights. For taking aim, the slide 141 may be set on the sight column to position the rear sight 145 for for the shooting yardage, and in taking aim, the extended rear end portion 128 of the draw-bar may be rested against the body. In taking aim with the rear sight positioned low, the side of the extended rear end portion of the draw-bar may be rested against the right cheek. In taking aim with the rear sight positioned at about the middle of the sight column, the side of the extended rear end portion of the draw-bar may be rested against the neck or rested on the right shoulder. In taking aim with the rear sight positioned along the upper portion of the sight column, the side of the extended rear end portion of the draw-bar may be rested against the point of the right shoulder or rested against the upper end of the right arm held close to the body, or rested lower down on the arm when the rear sight is positioned at the top end of the sight column.

The chuck plate 146 shown in Figure 34 is similar to chuck plate 105 except that the left chuck jaw is provided with a blade-like nock clamp spring 148 attached with screw 152, which latter is threaded into the front end of the chuck jaw. The spring 148, shown in more detail in Figure 35, has an angled front end portion 149 and an angled rear end portion 150. The angled front end portion of the nock clamp spring has a perforation 151 to receive the screw 152. The angled rear end portion of the nock clamp spring projects into a notch 147 in the left chuck jaw to prevent the bow string from catching under the spring. The nock clamp spring 148 affords a better grip on the arrow nock inserted in the throat of the chuck plate. An arrow chuck including chuck plate 146 may be employed on a draw-bar adapted for use on a hunting bow or adapted for use on a smaller bow.

A long heavy bow rather too strong to be drawn between the hands to the full shooting position for a twenty-eight inch long arrow, may be provided with a draw-bar guide 74, or guide 113, and a draw-bar 126 having an arrow chuck including chuck plate 146, and having the rear catch notch 133 located about six inches back from the front catch notch 131 for step-drawing the bow string to the position for shooting the arrow. In step-drawing the bow string, the chucked arrow and latched bow string may be drawn back with the two hands on the bow grip and draw-bar handle to catch the shoulder 134 of the rear catch notch on the draw-bar catch in the draw-bar guide, and then by turning the bow down so that the front side of the bow will be toward the ground and placing the right foot on the rear side of the bow grip, the bow string may be drawn back to catch the shoulder 132 of the front catch notch 131 on the catch in the draw-bar guide for the full shooting position. The nock clamp spring 148 in chuck plate 146 prevents the nock of the arrow from slipping out of the arrow chuck as when the bow is turned down in step-drawing the bow string to the full shooting position.

Referring to Figures 49 and 50, a knot 69 about five one-sixteenths of an inch long and about seven one-thirty-seconds of an inch in diameter is usually employed on a bow string 68 having a diameter about three one-thirty-seconds of an inch, but a smaller knot or a larger knot may be employed if desired. The knot 69 may be formed on the bow string with a suitable length of strong tie string having a diameter about twenty one-thousandths of an inch, but a smaller or a larger string may be employed if desired. The string for forming the knot may be wound around the bow string in tightly drawn half-hitches placed close together in layers. In forming the knot 69, a base layer about five one-sixteenths of an inch long of close half-hitches may be formed first on the bow string in the proper location. A second layer about nine one-thirty-seconds of an inch of close half-hitches may be formed on the base layer. A third layer about one-quarter of an inch long of close half-hitches may be formed on the second layer, and in this manner the knot may be built up with layer upon layer of half-hitches to about seven one-thirty-seconds of an inch in diameter. In forming a larger knot 69, a longer base layer of half-hitches may be employed, and if desired, a tie string slightly larger in diameter may be employed. If preferred, a second knot 71 may be formed on the bow string immediately above the string latch of the arrow chuck. A knot 71 may be formed with a small string wound tightly around the bow string and tied. A better knot 71 may be formed on the bow string with a small tie string applied around the bow string in one or more layers of close tightly drawn half-hitches. If preferred, the portion of the bow string coming in contact with the string latch of the arrow chuck may be surfaced with a winding 70 of thread. In the bow string shown in Figure 49, the lower end of the surface winding is anchored in the knot 69 and the upper end of the winding is anchored in the bow string. In the bow string shown in Figure 50, the winding 70 has its opposite ends anchored in the knots 69 and 71. The winding 70 and knots 69 and 71 may be lubricated with paraffin. Finely flaked graphite may be employed with paraffin as a bow string lubricant.

I claim:

1. An arrow shooter comprising a bow provided with a grip between two limb portions for holding the bow in the hand, a bow string for driving an arrow, a bow string draw-bar, and an arrow rest and a draw-bar guide and a draw-bar catch shoulder together on the side of the bow at the upper end of said grip; said draw-bar having a rearward portion and a forward portion, the rearward portion of said draw-bar having a handle and an arrow chuck, said handle extending downwardly, said arrow chuck including a spring pressed hinged double bow string latch having a trigger for moving the latch to release the bow string, the forward portion of said draw-bar slidable backwardly in said draw-bar guide and having a catch shoulder adapted to abut against the catch shoulder on the bow to hold the draw-bar in the drawn-back position with the bow string and the nock of an arrow held in said arrow chuck, said bow string having a knot for locating said arrow chuck on the bow string.

2. An arrow shooter comprising a bow provided with a grip between two limb portions for holding the bow in the hand, a bow string for driving an arrow, a bow string draw-bar, and an arrow rest and a draw-bar guide and a draw-bar catch shoulder together on the side of the bow at the upper end of said grip; said draw-bar having a rearward portion and a forward portion provided with a rear sight column and a front sight, the rearward portion of said draw-bar having a handle and an arrow chuck, said handle extending downwardly, said arrow chuck including a spring pressed hinged double bow string latch having a trigger for moving the latch to release the bow string, said sight column mounted on the rearward portion of said draw-bar and including a slide carrying a rear sight, said front sight mounted on the front end of said draw-bar, the forward portion of said draw-bar slidable backwardly in said draw-bar guide and having a catch shoulder adapted to abut against the catch shoulder on the bow to hold the draw-bar in the drawn-back position with the bow string and the nock of an arrow held in said arrow chuck, said bow string having a knot for locating said arrow chuck on the bow string.

3. An arrow shooter comprising a bow provided with a grip between two limb portions for holding the bow in the hand, a bow string for driving an arrow, a bow string draw-bar, and an arrow rest and a draw-bar guide and a draw-bar catch shoulder together on the side of the bow at the upper end of said grip; said draw-bar having a forward portion and a rearward portion and an extended rear end portion and provided with a rear sight column and a front sight, the rearward portion of said draw-bar having a handle and an arrow chuck, said handle extending downwardly, said arrow chuck including a spring pressed hinged double bow string latch having a trigger for moving the latch to release the bow string, said sight column mounted on the rearward portion of said draw-bar and including a slide carrying a rear sight, said front sight mounted on the front end of said draw-bar, the forward portion of said draw-bar slidable backwardly in said draw-bar guide and having a catch shoulder adapted to abut against the catch shoulder on the bow to hold the draw-bar in the drawn-back position with the bow string and the nock of an arrow held in said arrow chuck, said bow string having a knot for locating said arrow chuck on the bow string, the extended rear end portion of said draw-bar provided for resting the draw-bar against the body in taking aim.

HERBERT G. IRWIN.

References Cited in the file of this patent

UNITED STATES PATENTS

| Number | Name | Date |
|---|---|---|
| 1,210,332 | Kvistad | Dec. 26, 1916 |
| 1,605,300 | Thompson | Nov. 2, 1926 |
| 2,417,791 | Tyszkiewicz | Mar. 18, 1947 |
| 2,483,928 | Ott | Oct. 4, 1949 |
| 2,520,713 | Diehr | Aug. 29, 1950 |

FOREIGN PATENTS

| Number | Country | Date |
|---|---|---|
| 172 | Great Britain | 1886 |